(12) United States Patent
Attaluri et al.

(10) Patent No.: US 9,984,122 B2
(45) Date of Patent: *May 29, 2018

(54) QUERY PLAN OPTIMIZATION FOR LARGE PAYLOAD COLUMNS

(71) Applicant: International Business Machines Corporation, Armonk, NY (US)

(72) Inventors: Gopi K. Attaluri, Cupertino, CA (US); Vijayshankar Raman, Cupertino, CA (US); David C. Sharpe, St. Catharines (CA); Richard S. Sidle, Ottawa (CA); Liping Zhang, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/660,279

(22) Filed: Jul. 26, 2017

(65) Prior Publication Data

US 2017/0316056 A1 Nov. 2, 2017

Related U.S. Application Data

(63) Continuation of application No. 15/062,324, filed on Mar. 7, 2016.

(51) Int. Cl.
*G06F 17/30* (2006.01)
(52) U.S. Cl.
CPC .. *G06F 17/30466* (2013.01); *G06F 17/30469* (2013.01); *G06F 17/30595* (2013.01)
(58) Field of Classification Search
USPC ............... 707/609, 607, 687, 705, 790, 813
See application file for complete search history.

(56) References Cited

U.S. PATENT DOCUMENTS 7,933,208 B2 4/2011 Bronnimann et al.
8,315,990 B2 11/2012 Barga et al.
(Continued)

OTHER PUBLICATIONS

Appendix P, List of IBM Patents or Patent Applications Treated as Related, 2 pages, dated Jul. 28, 2017.
(Continued)

*Primary Examiner* — Sana A Al-Hashemi
(74) *Attorney, Agent, or Firm* — Christopher McLane; Steven L. Fisher-Stawinski

(57) ABSTRACT

A computer-implemented method includes receiving a query plan. The method includes identifying a plurality of qualified relevant rows and one or more encoding candidate payload columns. The method includes analyzing the relevant rows in the encoding candidate payload columns to yield a count of distinct contents and a payload column width. The method includes estimating a cost and determining whether the cost is larger than an amount of available memory for on-the-fly encoding all of the plurality of encoding candidate payload columns. The method is responsive to the estimated cost being less than the amount of available memory, by on-the-fly encoding the encoding candidates and responsive to the estimated cost being greater than the amount of available memory by on-the-fly encoding fewer than all of the encoding candidates so as not to exceed the available memory, and leaving alone one or more remaining encoding candidate payload columns unencoded.

1 Claim, 3 Drawing Sheets

(56) References Cited

U.S. PATENT DOCUMENTS

| | | | |
|---|---|---|---|
| 8,706,727 | B2 | 4/2014 | Yang et al. |
| 8,806,089 | B2 | 8/2014 | Li et al. |
| 8,868,545 | B2 | 10/2014 | Xu et al. |
| 9,043,310 | B2 | 5/2015 | Liu et al. |
| 2004/0054683 | A1 | 3/2004 | Nishizawa et al. |
| 2013/0103891 | A1* | 4/2013 | Sharon ............... G06F 12/0246 711/103 |
| 2013/0337789 | A1* | 12/2013 | Johnson .................. H04W 4/02 455/414.1 |
| 2014/0006380 | A1 | 1/2014 | Arndt et al. |
| 2014/0098886 | A1* | 4/2014 | Crenshaw ............ H04N 19/176 375/240.16 |
| 2014/0372411 | A1 | 12/2014 | Attaluri et al. |
| 2014/0372470 | A1 | 12/2014 | Attaluri et al. |
| 2015/0006485 | A1 | 1/2015 | Christiansen |
| 2015/0074082 | A1 | 3/2015 | Yoon et al. |
| 2015/0169683 | A1 | 6/2015 | Chandramouli et al. |
| 2015/0178305 | A1 | 6/2015 | Mueller et al. |
| 2015/0261751 | A1 | 9/2015 | Kim et al. |
| 2017/0269876 | A1* | 9/2017 | Mukhopadhyay .... G06F 3/0661 |

OTHER PUBLICATIONS

Appendix P, List of IBM Patents or Patent Applications Treated as Related, 2 pages, dated Oct. 5, 2017.

Kissinger et al., "Query Processing on Prefix Trees Live", SIGMOD '13, Jun. 22-27, 2013, New York, NY, USA, Copyright 2013 ACM 978-1-4503-2037-5/13/06, pp. 1105-1108.

Lee et al.,"Joins on Encoded and Partitioned Data", Proceedings of the VLDB Endowment, vol. 7, No. 13, Copyright 2014 VLDB Endowment 2150-8097/14/08, pp. 1355-1366.

Raman et al., "DB2 with BLU Acceleration: So Much More than Just a Column Store", Proceedings of the VLDB Endowment, vol. 6, No. 11, Copyright 2013 VLDB Endowment 2150-8097/13/09, 12 Pages.

Attaluri et al., "Query Plan Optimization for Large Payload Columns", U.S. Appl. No. 15/062,324, filed Mar. 7, 2016, 24 pages.

\* cited by examiner

QUERY PLAN OPTIMIZATION FOR LARGE PAYLOAD COLUMNS

BACKGROUND

The present invention relates generally to the field of relational database management systems, and more particularly to optimizing query plans for large payload columns.

In modern relational databases such as IBM® DB2®, encoding and optimization techniques are applied to ensure performance. On-the-fly encoding is a technique and other encoding techniques that take place during the query processing may require a large amount of memory. Memory usage is estimated at the time of compiling the query by an optimizer. For large payload columns, database users and developers continue to face challenges when predicting how much memory an on-the-fly encoding technique will require.

SUMMARY

A computer-implemented method includes receiving a query plan. The method includes identifying a plurality of qualified relevant rows. The method includes identifying one or more encoding candidate payload columns. The method includes analyzing the relevant rows in the encoding candidate payload columns to yield a count of distinct contents and a payload column width. The method includes estimating a cost. The method includes determining whether the cost is larger than an amount of available memory for on-the-fly encoding all of the plurality of encoding candidate payload columns. The method is responsive to the estimated cost being less than the amount of available memory, by on-the-fly encoding the encoding candidates. The method is responsive to the estimated cost being greater than the amount of available memory by on-the-fly encoding fewer than all of the encoding candidates so as not to exceed the available memory, and leaving alone one or more remaining encoding candidate payload columns unencoded.

A corresponding computer program product and computer system are also disclosed.

DETAILED DESCRIPTION

Figure 1:
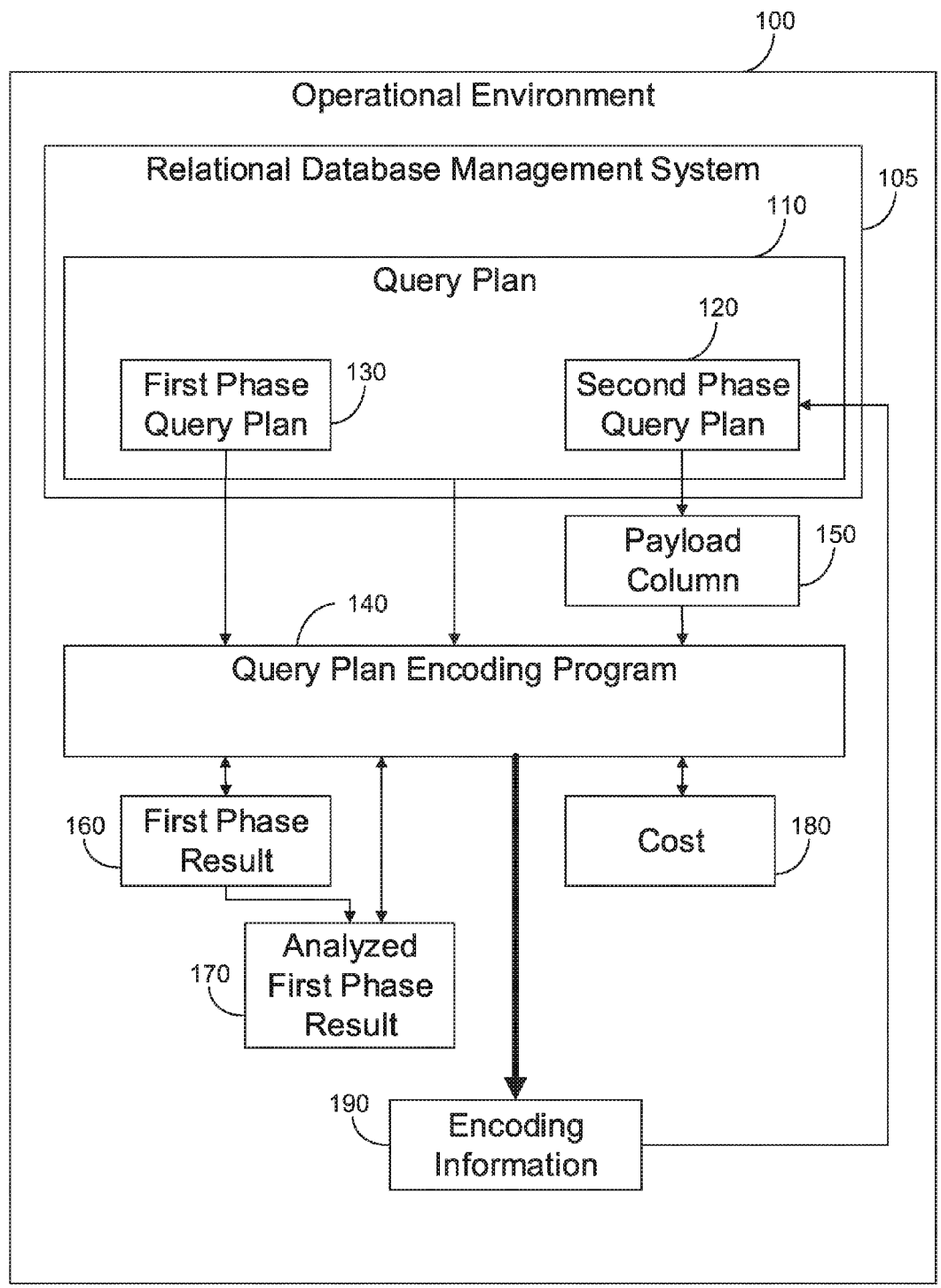
FIG. 1 is a block diagram of an operational environment suitable for operation of a query plan encoding program, in accordance with at least one embodiment of the present invention.

Referring now to the invention in more detail, FIG. 1 is a block diagram displaying an exemplary operational environment suitable for operation of at least one embodiment of the invention. An operational environment 100 may include a relational database management system 105. The relational database management system 105 is a relational database management system ("RDBMS") such as IBM® DB2®, Microsoft® SQL Server®, Oracle® Database, and similar software products running on a computer server or other general purpose computer, for example the computer depicted in FIG. 3. In processing and/or compiling a query, the relational database management system 105 may generate a query plan 110, which includes a first phase query plan 130 and a second phase query plan 120, a payload column 150, a query plan encoding program 140, a first phase result 160, an analyzed first phase result 170, a cost 180, and encoding information 190, all in mutual communication and interconnected via the operational environment 100. The operational environment 100 may be a cloud-based, virtual, or distributed environment or a remote environment on defined server hardware, or, more generally, the operational environment 100 may be any type of environment suitable for access by the query plan encoding program 140 with the relational database management system 105.

The query plan 110, may be an execution plan. The query plan 110 is a set of steps used to access data in the relational database management system 105. Steps within the query plan 110 may be ordered. Steps within the query plan 110 may be grouped together as belonging to different phases within the query plan 110, such as the first phase query plan 130 and the second phase query plan 120. The query plan 110 may include other phases. A phase may be, for example, a join build phase, a build phase, or a table scan phase. The query plan encoding program 140 is able to process the first phase query plan 130 and the second phase query plan 120 within the relational database management system 105. In some embodiments, the query plan 110 is for a join or a "groupby" operation.

The payload column 150 is for the second phase query plan 120. The payload column 150 includes cargo of a data transmission and a part of transmitted data for the second phase query plan 120 via the relational database management system 105. The payload column 150 is structured as a database column with a total column width and a number of rows. Each row in the payload column 150 has a width. The total column width may be a width of the largest row in the payload column 150. The total column width may be a total memory available to the relational database management system 105.

The query plan encoding program 140 is able to process the first phase query plan 130 via the relational database management system 105. When the query plan encoding program 140 processes the first phase query plan 130, the query plan encoding program 140 yields the first phase result 160. The first phase result 160 may include information that is collected during the first phase query plan 130 by the query plan encoding program 140. For example, as the query plan encoding program 140 processes the first phase query plan 130, the query plan encoding program 140 may collect information and data about the first phase query plan 130 and metadata about how the first phase query plan 130 is processed. For example, how many times certain information is processed, types of steps repeated, and/or how long certain steps take.

The query plan encoding program 140 may analyze the first phase result 160 to yield the analyzed first phase result 170. The analyzed first phase result 170 may include information about the data within the first phase result 160 such as total tuple count, a uniqueness ratio, or other data characteristics about the first phase result 160. A tuple is a finite ordered list of elements. A tuple count is a count of the finite ordered list of elements. The tuple may be included in the first phase result 160, such as elements within a payload column as key/value pairs. A uniqueness ratio may be a count associated with elements not a part of a list of elements or only referenced once in the first phase result 160 as compared to a total size for the list of elements.

The cost 180 is a cost associated with processing and encoding the second phase query plan 120 via the relational database management system 105. The cost 180 may be an amount of memory necessary to process the second phase query plan 120. The amount of memory necessary to process the second phase query plan 120 may be memory needed to encode each payload column based on a number of distinctive objects in each column and based on the column width. The cost 180 may be an amount of time necessary to process the second phase query plan 120. The cost 180 is determined by the query plan encoding program 140 based on the second phase query plan 120 and the payload column 150.

The encoding information 190 includes data characteristics of the analyzed first phase result 170. The encoding information 190 is expressed such that the second phase query plan 120 may be encoded with the encoding information 190 by the query plan encoding program 140.

The query plan encoding program 140 receives the query plan 110, the first phase query plan 130, the second phase query plan 120 and the payload column 150 to yield the first phase result 160, the analyzed first phase result 170, the cost 180, and the encoding information 190. The query plan encoding program 140 may receive the query plan 110, the first phase query plan 130, the second phase query plan 120, and/or the payload column 150 via the relational database management system 105. The query plan encoding program 140 may be a dedicated query plan encoding program, a function integrated within another program, or any other program or function that can communicate with the query plan 110, the first phase query plan 130, the second phase query plan 120 and the payload column 150 to generate the first phase result 160, the analyzed first phase result 170, the cost 180, and the encoding information 190.

Figure 2:
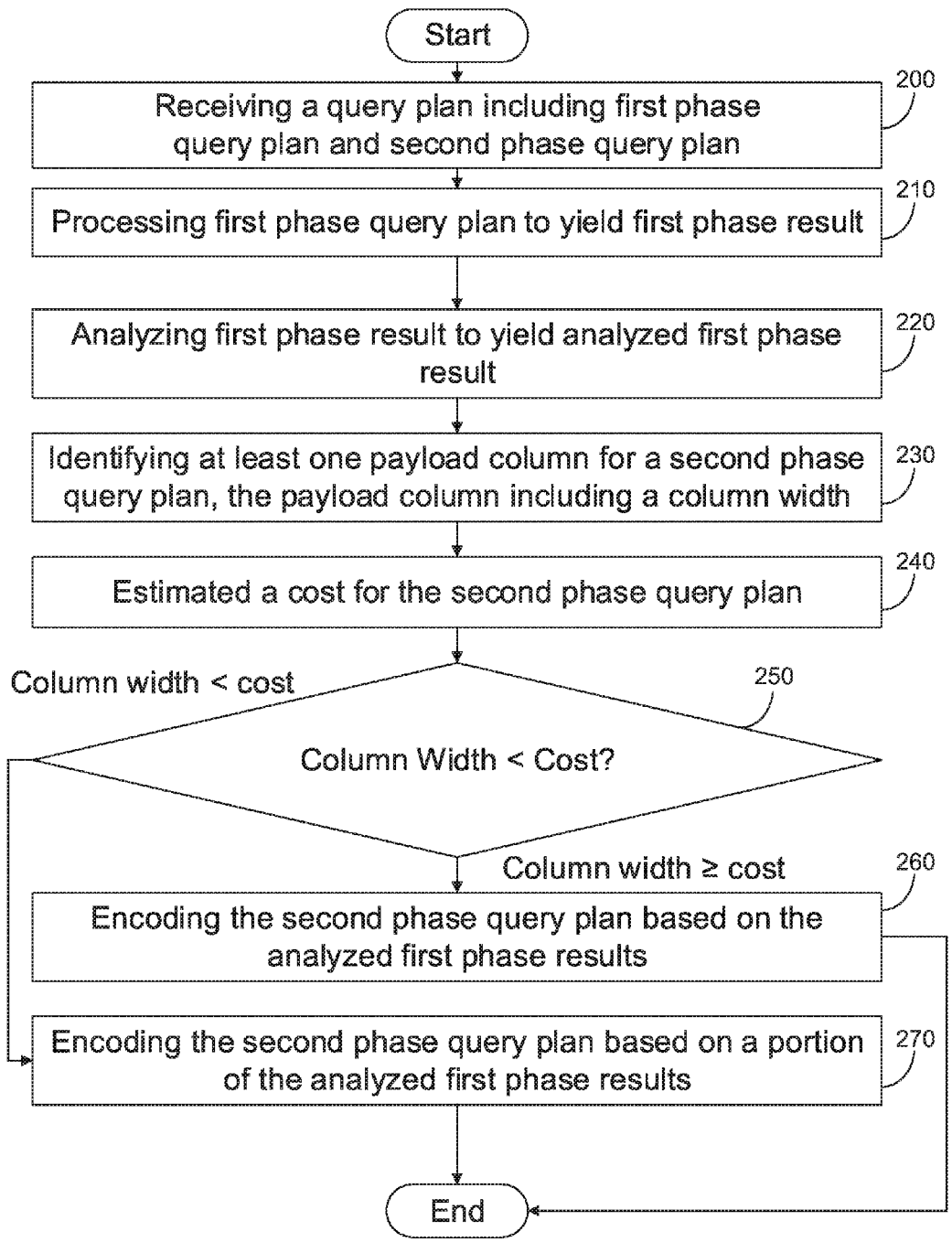
FIG. 2 is a flowchart depicting operational steps for a query plan encoding program, in accordance with at least one embodiment of the present invention.

FIG. 2 is a flowchart depicting the operational steps of the query plan encoding program 140, executing within the operational environment 100 of FIG. 1, in accordance with an embodiment of the present invention.

At step 200 the query plan encoding program 140 receives the query plan 110, which includes the first phase query plan 130 and the second phase query plan 120. Receiving may include a user explicitly calling the query plan encoding program 140 from a command line interface using a reference to the query plan 110 as an argument. Alternatively, receiving may include automated calls to the query plan encoding program 140, for example, from an integrated development environment or as part of a query plan encoding program management system. The query plan encoding program 140 may receive the query plan 110 from the relational database management system 105.

At step 210, the query plan encoding program 140 processes the first phase query plan 130 to yield the first phase result 160. Processing the first phase query plan 130 may include parsing, translating, expanding functions and variables, and executing steps within the first phase query plan 130. The query plan encoding program 140 may use the first phase result 160 as input.

At step 220, the query plan encoding program 140 analyzes the first phase result 160 to yield the analyzed first phase result 170. Analyzing the first phase result 160 may including scanning the first phase result 160 based on a data characteristic, such as tuple count, or uniqueness ratio. The data characteristic may be predetermined by a user. The query plan encoding program 140 may use the analyzed first phase result 170.

At step 230, the query plan encoding program 140 identifies the payload column 150. The payload column 150 is for the second phase query plan 120 and includes a total column width. The query plan encoding program 140 may identify qualified relevant rows. The qualified relevant rows may be based on the first phase query plan 130. Each of the qualified relevant rows may include a payload column, such as the payload column 150. The qualified relevant rows may be the data characteristics analyzed at step 220. The qualified relevant rows may be rows with variables, steps, functions, and/or queries useful during a processing of the first phase query plan 130.

The query plan encoding program 140 may identify an encoding candidate payload column. The encoding candidate payload column may be based on a qualified relevant row that has not been encoded. In some embodiments, encoding is on-the-fly encoding.

The query plan encoding program 140 may analyze relevant candidate rows of the encoding candidate payload column to identify a count of distinct contents and a payload column width. The distinct contents may be a tuple count and/or a uniqueness ratio. The distinct contents may be identified by parsing, scanning, or otherwise searching the query plan 110 for encoded content, duplicate content, and/or unique content. Content may be a variable, step, function, and/or query within the query plan 110 or the first phase query plan 130. Content may be predetermined by a user. The distinct content may be determined by a user. The distinct content may be determined dynamically based on what is encoded during a processing of the query plan 110.

At step 240, the query plan encoding program 140 estimates the cost 180. Estimating is based on the analyzed first phase result 170. The cost 180 is a cost associated with processing and encoding the second phase query plan 120. Estimating may include determining a byte count for the analyzed first phase result 170. Estimating may include analyzing steps within the second phase query plan 120 and predicting memory required to process the second phase query plan 120. Estimating may be based on a size of a dictionary for the payload column 150, such as a byte count for the dictionary. Estimating a cost may include an estimated size for an encoding dictionary that is sufficient to perform on-the-fly encoding of the qualified relevant rows of payload columns. The estimated size may be based on a count of distinct contents, a payload column width, and a hash table bucket size for the encoding dictionary.

The dictionary may be an encoding dictionary. A hash table bucket with a hash table bucket size may be for the dictionary. The dictionary may include a hash dictionary. The hash dictionary may a library of content for the query plan 110 that has been hashed. The hash table bucket may be hash data for steps necessary to on-the-fly encode the second phase query plan 120. The hash table bucket size may be an amount of memory. The hash table bucket size may be proportional to an amount of memory necessary to on-the-fly encode the second phase query plan 120.

At step 250 the query plan encoding program 140 compares the cost 180 to the total column width. This comparison may include comparing the cost of encoding the payload column to whether the system has enough resources (memory available). The query plan encoding program 140 determines whether the cost 180 is greater than or equal to the total column width of the payload column 150. In some embodiments, the total column width is measured in units similar to the cost 180, such as memory or bytes. In such an embodiment, the query plan encoding program 140 determines whether the cost 180 is greater than or equal to the total column width of the payload column 150 arithmetically. In other embodiments, the query plan encoding program 140 may relate the total column width to the analyzed first phase result 170 using a predetermined ratio. The cost 180 may be an amount of memory sufficient to perform on-the-fly encoding of the encoding candidates for the payload column.

If the cost 180 is greater than or equal to the total column width the query plan encoding program 140 proceeds to step 260. At step 260 the query plan encoding program 140 encodes data in the second phase query plan 120 based on the analyzed first phase result 170. Encoding may involve substituting, adding, and/or removing data within the encoding information 190 for information within the second phase query plan 120. If the query plan encoding program 140 determines to encode data in the second phase query plan, such as the candidate payload column, the query plan encoding program 140 encodes each relevant row in the candidate payload column.

In some embodiments, the query plan encoding program 140 proceeds from step 260 to process the second phase query plan 120, with the second phase query plan 120 having been encoded based on the analyzed first phase result 170.

If the cost 180 is less than the total column width the query plan encoding program 140 proceeds to step 270. At step 270 the query plan encoding program 140 encodes a portion of data in the second phase query plan 120 based the analyzed first phase result 170. The portion of the data in the second phase query plan 120 may be the total width of the payload column 150. The portion of the data in the second phase query plan 120 may be based on the memory and/or resources available to the relational database management system 105. The query plan encoding program 140 may determine which portion of the analyzed first phase result to use based on a predetermined formula, algorithm, and/or ranking system. If the query plan encoding program 140 determines to encode a portion of data in the second phase query plan 120, such as the candidate payload column, the query plan encoding program 140 encodes each relevant row in the candidate payload column.

Figure 3:
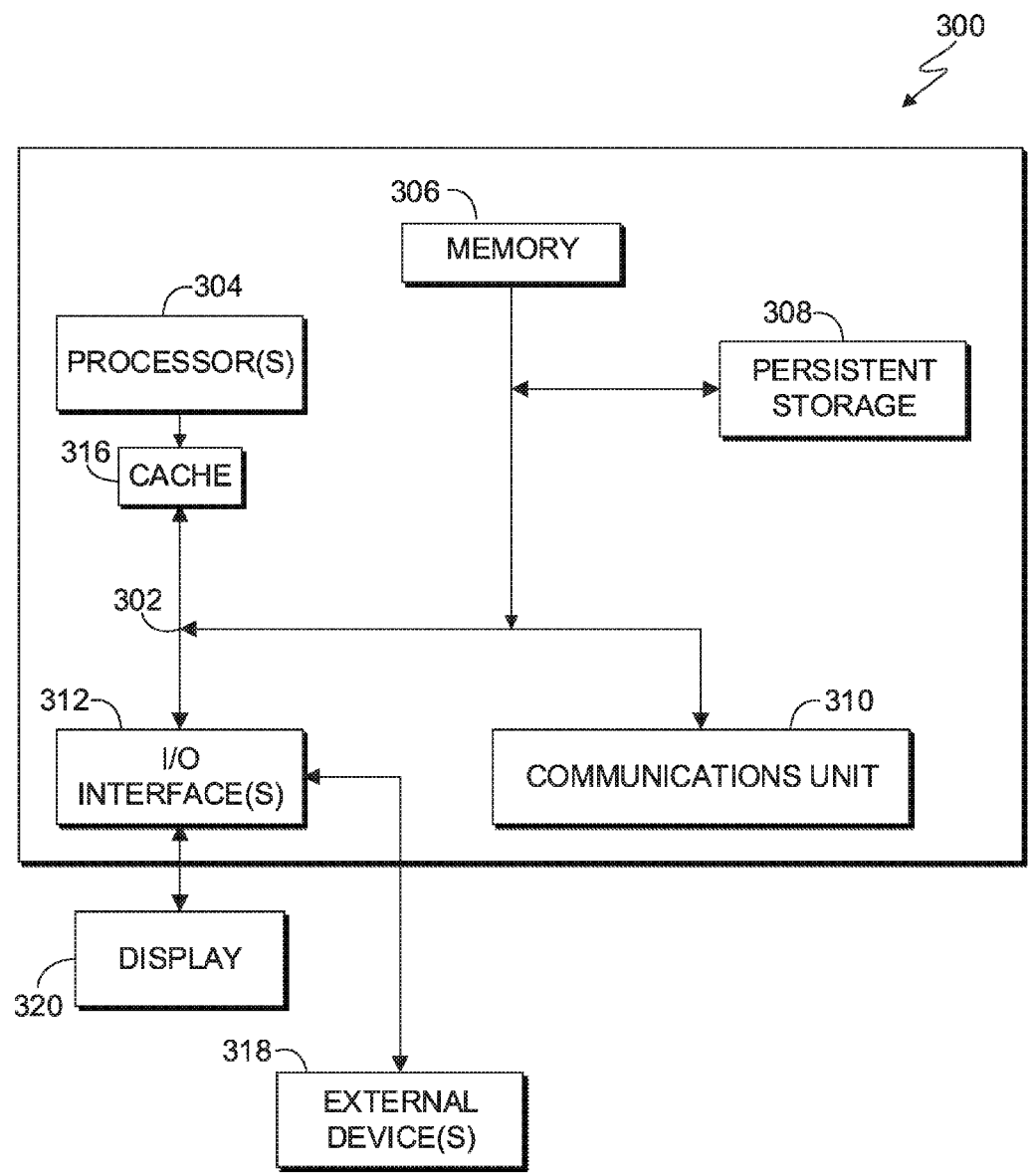
FIG. 3 is a block diagram of components of a computing apparatus suitable for executing a query plan encoding program, in accordance with at least one embodiment of the present invention.

FIG. 3 is a block diagram depicting components of a computer 300 suitable for executing the query plan encoding program 140. FIG. 3 displays the computer 300, the one or more processor(s) 304 (including one or more computer processors), the communications fabric 302, the memory 306, the RAM 316, the cache 316, the persistent storage 308, the communications unit 310, the I/O interfaces 312, the display 320, and the external devices 318. It should be appreciated that FIG. 3 provides only an illustration of one embodiment and does not imply any limitations with regard to the environments in which different embodiments may be implemented. Many modifications to the depicted environment may be made.

As depicted, the computer 300 operates over a communications fabric 302, which provides communications between the cache 316, the computer processor(s) 304, the memory 306, the persistent storage 308, the communications unit 310, and the input/output (I/O) interface(s) 312. The communications fabric 302 may be implemented with any architecture suitable for passing data and/or control information between the processors 304 (e.g., microprocessors, communications processors, and network processors, etc.), the memory 306, the external devices 318, and any other hardware components within a system. For example, the communications fabric 302 may be implemented with one or more buses or a crossbar switch.

The memory 306 and persistent storage 308 are computer readable storage media. In the depicted embodiment, the memory 306 includes a random access memory (RAM). In general, the memory 306 may include any suitable volatile or non-volatile implementations of one or more computer readable storage media. The cache 316 is a fast memory that enhances the performance of computer processor(s) 304 by holding recently accessed data, and data near accessed data, from memory 306.

Program instructions for the query plan encoding program 140 may be stored in the persistent storage 308 or in memory 306, or more generally, any computer readable storage media, for execution by one or more of the respective computer processors 304 via the cache 316. The persistent storage 308 may include a magnetic hard disk drive. Alternatively, or in addition to a magnetic hard disk drive, the persistent storage 308 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of the persistent storage 308.

The communications unit 310, in these examples, provides for communications with other data processing systems or devices. In these examples, the communications unit 310 may include one or more network interface cards. The communications unit 310 may provide communications through the use of either or both physical and wireless communications links. Query plan encoding program 140 may be downloaded to the persistent storage 308 through the communications unit 310. In the context of some embodiments of the present invention, the source of the various input data may be physically remote to the computer 300 such that the input data may be received and the output similarly transmitted via the communications unit 310.

The I/O interface(s) 312 allows for input and output of data with other devices that may operate in conjunction with the computer 300. For example, the I/O interface 312 may provide a connection to the external devices 318, which may include a keyboard, keypad, a touch screen, and/or some other suitable input devices. External devices 318 may also include portable computer readable storage media, for example, thumb drives, portable optical or magnetic disks, and memory cards. Software and data used to practice embodiments of the present invention may be stored on such portable computer readable storage media and may be loaded onto the persistent storage 308 via the I/O interface(s) 312. The I/O interface(s) 312 may similarly connect to a display 320. The display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A computer-implemented method, the method comprising:
 receiving a query plan, wherein said query plan is an operation for a join, said query comprising a first phase query plan and a second phase query plan;

wherein, said first phase is a join phase and said second phase is a join phase, and said query plan also includes a build phase and a table scan phase;

processing said first phase query plan, wherein processing said first phase query plan includes parsing, translating, expanding functions, expanding variables, and executing steps within said first phase query plan;

processing said second phase query plan, said second phase query plan having been one-the-fly encoded;

identifying a plurality of qualified relevant rows, based on the first phase query plan, each of said plurality of qualified relevant rows comprising one or more payload columns;

identifying one or more encoding candidate payload columns, based on determining those of said plurality of qualified relevant rows that are not encoded, wherein encoding is on-the-fly encoding;

analyzing said relevant rows of said candidate payload column to yield a count of distinct contents and a payload column width, wherein said distinct content is at least one of a tuple count and a uniqueness ratio;

estimating a cost, said cost comprising an estimated size for an encoding dictionary sufficient to perform on-the-fly encoding of said plurality of qualified relevant rows of said payload columns, said estimated size being based on said count of distinct contents, said payload column width, and a hash table bucket size for said encoding dictionary;

determining whether said cost is larger than an amount of available memory for on-the-fly encoding all of said plurality of encoding candidate payload columns; and responsive to said cost being less than said amount of available memory, on-the-fly encoding said encoding candidate payload column;

responsive to said cost being greater than said amount of available memory, on-the-fly encoding fewer than all of said encoding candidates so as not to exceed said available memory, and leaving alone one or more remaining encoding candidate payload columns unencoded.

* * * * *